United States Patent [19]
Heiniger et al.

[11] Patent Number: 6,007,045
[45] Date of Patent: Dec. 28, 1999

[54] MEMBRANE VALVE ASSEMBLY

[75] Inventors: Martin Heiniger, Schaffhausen, Switzerland; Walter Bannwarth, Lauchringen, Germany

[73] Assignee: Georg Fischer Rohrleitungssysteme AG, Switzerland

[21] Appl. No.: 09/133,650

[22] Filed: Aug. 13, 1998

[30] Foreign Application Priority Data

Aug. 14, 1997 [CH] Switzerland .......................... 1915/97

[51] Int. Cl.⁶ .............................. F61K 31/143; F61K 1/00
[52] U.S. Cl. ...................... 251/63.5; 251/63.6; 251/61.2; 251/331; 251/61.5
[58] Field of Search ................................ 251/63.5, 63.6, 251/61.1, 61.2, 61.4, 61.5, 331

[56] References Cited

U.S. PATENT DOCUMENTS

| | | | |
|---|---|---|---|
| 2,199,549 | 5/1940 | Saunders | 251/63.6 |
| 3,250,511 | 5/1966 | Priese | 251/331 |
| 3,628,770 | 12/1971 | Rost | 251/331 |
| 4,471,938 | 9/1984 | Schwarz | 251/63.6 |
| 4,545,565 | 10/1985 | Sano et al. | 251/331 |
| 4,596,268 | 6/1986 | Jonas | 137/375 |
| 4,915,353 | 4/1990 | Danko | 251/331 |
| 4,917,357 | 4/1990 | Danko | 251/331 |
| 4,991,621 | 2/1991 | Steudler, Jr. | 137/505.46 |
| 5,174,331 | 12/1992 | Steudler, Jr. | 137/505.46 |
| 5,279,325 | 1/1994 | Kaspers | 251/61.5 |

FOREIGN PATENT DOCUMENTS

571850-A1  12/1993  European Pat. Off. .............. 251/331

*Primary Examiner*—Steven O. Douglas
*Assistant Examiner*—Tuan Nguyen
*Attorney, Agent, or Firm*—Gifford, Krass, Groh, Sprinkle, Anderson & Citkowski, P.C.

[57] ABSTRACT

In a pneumatically or hydraulically driven membrane valve assembly with a pressure piece actuated by a pressure spindle, a membrane support member designed as a coupling member engages the pressure piece. The membrane member is connected to the membrane support member by means of a releasable coupling extending through the pressure piece. The pressure spindle can be coupled to the membrane support member by a releasable ridge/groove-connection. Thereby, all types of medium membranes can be coupled even at a later stage. The valve assembly has a top housing portion, an intermediate housing piece and a bottom housing portion. The top housing portion is connected to the intermediate piece by screwing it thereon. Both the top portion and the intermediate piece have circumferential stop faces engaging each other in the screwed on state and having at least partially differing pitch values for creating a predetermined bias in the thread. The mutual rotational movement is limited by a step shaped end stop member constituted by the afore mentioned circumferential stop faces to avoid an overtightening.

12 Claims, 2 Drawing Sheets

MEMBRANE VALVE ASSEMBLY

FIELD OF THE INVENTION

The present invention refers to a pneumatically or hydraulically driven membrane valve assembly, comprising a housing including a top housing portion, an intermediate piece and a bottom housing portion. In the housing, there are provided a membrane member, a pressure piece member adapted to cooperate with the membrane member' and a pressure spindle for operating the pressure piece member and, thereby, the membrane member.

BACKGROUND OF THE INVENTION

The membrane members for pneumatically or hydraulically driven membrane valve assemblies that are commercial use in these days can be classified roughly in one of two groups:

Elastomeric membranes (EPDM-membranes) that are fixed to the pressure spindle and the pressure piece, respectively, by means of a screwed connection and Polytetrafluor ethylene membranes (PTFE-membranes) including a support membrane member made of an elastomeric material that are fixed to the pressure spindle and the pressure piece, respectively, by means of a bayonet connection.

By providing a bayonet connection, as disclosed, for example, in German Published Patent Application DE-A1-30 00 510, it is avoided that the closure pressure is induced from the pressure spindle via the membrane pin, whereby an axial displacement path is provided between pressure spindle or pressure piece and membrane member. An unduly high pressure acting onto the membrane pin can lead to damage of the membrane member and/or the lower portion of the valve housing.

In a membrane valve assembly of the kind referred to above, the pressure piece cannot be removed without disassembling the drive unit for operating the valve assembly. As a result, replacing the membrane assembly by another one requires quite a high effort if such replacement has to be done later on.

In the case of pneumatically operated membrane valve assemblies, the correct positioning of the connecting pieces for pressurized air required for operating the valve assembly is of essential importance. The disadvantage of known membrane valve assemblies may be seen in the fact that they do not provide for a reliable positioning of the connecting pieces for pressurized air which usually are integrated into the top housing portion of the valve assembly. Moreover, the housing portion can unintentionally become loose due to the lack of a certain bias force in the threaded connection.

OBJECTS OF THE INVENTION

Having this background and these disadvantages, respectively, in mind, it is an object of the invention to provide a pneumatically or hydraulically driven membrane valve assembly of the kind referred to herein before in which the membrane member can be removed and replaced, respectively, even later on or belated e.g. according to the requirements of a customer asking for a EPDM- or a PTFE-membrane, without the need to disassemble the driving means for operating the valve assembly.

It is a further object of the invention to provide a pneumatically or hydraulically driven membrane valve assembly of the kind referred to herein before in which the connecting pieces for pressurized air are always exactly positioned, simultaneously providing a well defined biased screw connection between the housing portions.

SUMMARY OF THE INVENTION

To meet these and other objects, the invention provides a pneumatically or hydraulically driven membrane valve assembly, comprising a housing including a top housing portion, an intermediate piece and a bottom housing portion.

In the interior of that housing, there are provided a membrane member, a pressure piece adapted to cooperate with the membrane member, a pressure spindle for operating the pressure piece and, thereby, the membrane member, and a membrane support member.

Moreover, the valve assembly comprises a drive assembly for driving the above mentioned pressure spindle.

The membrane support member is designed as a coupling member that engages the pressure piece, and the membrane member is connected to the membrane support member by means of a releasable coupling extending through the pressure piece. Thereby, the pressure spindle can be coupled with the membrane support member with the help of a releasable groove/ridge connection such that the membrane supporting member can be removed and replaced, respectively, independently of the position of the pressure spindle when the drive assembly is in its assembled position.

A particularly advantageous groove/ridge connection may be constituted by a ridge in the shape of an annular projection located at the front face of the pressure spindle, and by an annular groove provided in the membrane support member and at least partially receiving that annular projection. Preferably, that annular ridge is constituted by providing an annular groove close to the front face end of the pressure spindle.

Advantageously, the membrane support member comprises a recess that is designed such that the groove/ridge connection required for connecting the pressure spindle to the membrane support member can be established even if the membrane support member is inserted into the intermediate piece.

In a further aspect, the invention provides a pneumatically or hydraulically driven membrane valve assembly, comprising a housing including a top housing portion, an intermediate piece and a bottom housing portion. The top housing portion is connected to the intermediate piece by means of a thread connection. Thereby, the top housing portion and the intermediate piece comprise circumferential stop faces resting on each other and having at least partially differing pitch values for establishing a bias in the thread connection when the top housing portion and the intermediate piece are screwed to each other. The rotating screw-on movement is limited by an end stop member constituted by the above mentioned circumferential stop faces.

Preferably, each of the circumferential stop faces are provided in pairs offset to each other by 180° to thereby constitute end stops.

In a particularly preferred embodiment, one of the circumferential stop faces, preferably the stop face provided on the intermediate piece, comprises two portions having differing pitch values, whereby the second portion has a lower pitch than the first portion, preferably a pitch with the value zero, for providing a predetermined bias in the thread direction. Hereby, experience has shown that a sufficient bias can be ensured if the first portion of the circumferential stop face extends around approximately 135° and the second portion of the circumferential stop face extends around approximately 45°.

The above described particular design of the valve housing comprising the well defined stop faces may be a preferred embodiment of the membrane valve assembly according to the present invention and as claimed in claim 1. However, such a housing design can also be used in conjunction with other designs of the membrane valve assembly, partially or fully lacking the features defined in claim 1.

Driving assemblies for membrane valves are built in three functionally different groups:

FC (fail close), i.e. the force of a biased spring closes the valve;

FO (fail open), i.e. the force of a biased spring opens the valve; and

DA (double acting), i.e. the force of a biased spring either opens or closes the valve.

In all three designs, the closure movement is performed by a pressure force acting onto the membrane member via the pressure spindle. A distribution of that pressure force exerted by the pressure spindle is ensured by the provision of the pressure piece. The required force is created, depending on the design of the valve assembly, by means of springs or by means of pressurized air. Thereby, it is understood that the design of the valve assembly according to the present invention may be realized in conjunction with all of the three above mentioned designs of driving assemblies.

BRIEF DESCRIPTION OF THE DRAWINGS

In the following, an embodiment of the membrane valve assembly according to the invention will be further described, with reference to the accompanying drawings, in which.

DETAILED DESCRIPTION OF A PREFERRED EMBODIMENT

Figure 1:
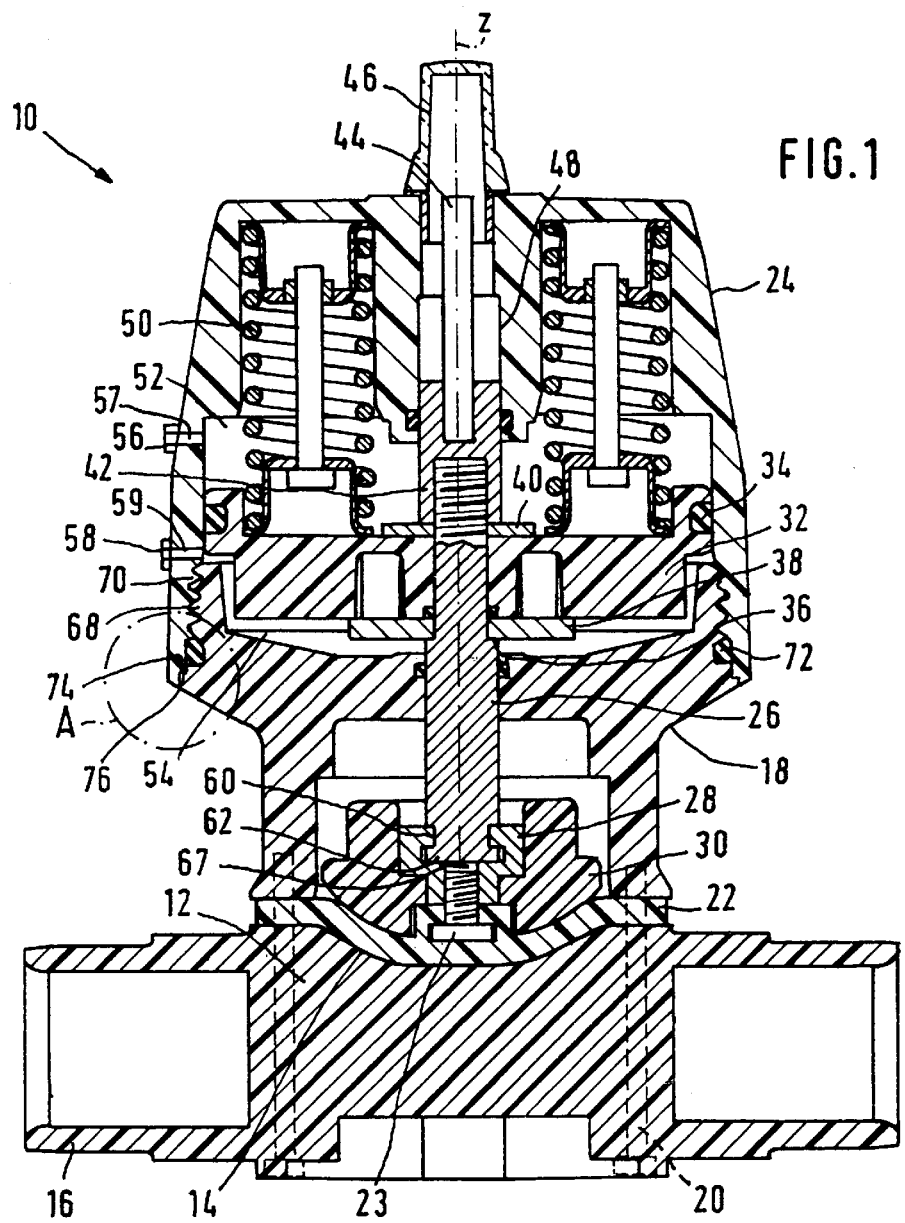
FIG. 1 shows a cross sectional view of the membrane valve assembly of the invention.

The membrane valve assembly 10 shown in FIG. 1 comprises a bottom housing portion 12 designed as a flow body member and incorporating an integral valve seat 14 as well as a pair of tubular connecting pieces 16 for connecting the valve assembly to a (not shown) piping system. The bottom housing portion 12 is directly fixed to an intermediate member 18 by means of screws 20. Between the bottom housing portion 12 and the intermediate member 18, an elastomeric membrane member 22 is clamped. The top cover of the valve housing is constituted by a top housing portion 24 which is screwed onto the intermediate member 18.

A pressure spindle 26 is releasably connected to the membrane member 22 by means of a membrane support member 28 that is designed as a coupling piece. The membrane support member 28 is fittingly inserted into a pressure piece 30 and is connected by screwing to the membrane member 22. Thereby, a threaded connection 23 provided and anchored in the membrane member 22 engages an internal thread 67 of the membrane support member 28, the internal thread 67 extending in the direction of the z-axis of the pressure spindle 26. Thus, the pressure piece 30 is held in its operating position by the membrane support member 28 inserted into the pressure piece 30 and by the membrane member 22 connected by screwing from the opposite side.

The stroke drive of the membrane valve assembly 10, i.e. the control movement of the pressure spindle member 26 along its axial z-direction, is realized pneumatically by means of the displacement of a piston member 32 connected to the pressure spindle member 26. The piston member 32 is sealed along the inner wall of the top housing portion 24 by means of a sealing ring 34 received in a circumferential groove provided in the piston 32.

In order to set the position of the piston 32 with regard to the pressure spindle member 26, the latter one has a portion with a reduced diameter, whereby a stepped portion 36 is created. A first washer member 38 is located on that stepped portion 36, the piston member 32 resting on said first washer member 38. The portion of the pressure spindle member 26 with the reduced diameter that extends through the piston member 32 is screwed to a spindle nut member 42 whereby a second washer member 40 is inserted between the piston member 32 and the spindle nut member 42. Thus, the piston member 32 is firmly connected with the pressure spindle member 26. An indicator pin 44, extending in the direction of the axis z of the pressure spindle member 26, is connected by screwing to the spindle nut member 42. The indicator pins 44 towers above the top housing portion 24 when the valve assembly is in its open position. The spindle nut member 42 is slidingly guided in a guide bush member 48 integrally formed to the top housing portion 24. The guiding bush member 48 is open towards the outside of the housing top portion 24 and covered by means of a transparent bell-like cover member 46 that temporarily receives the indicator pin 44.

Between the top housing portion 24 and the piston member 32, helical spring members 50 are inserted that exert a force onto the piston member 32 directed towards the membrane member 22. In the embodiment of a membrane valve assembly 10 shown in FIG. 1 and discussed herein, no force acting in the opposite direction is provided. Thus, the helical spring members 50 exert a pressure force that urges the membrane member 22, via the pressure spindle member 26 and the pressure piece 30, against the valve seat 14; the result is that the valve assembly is held in its closed position. As can be seen in FIG. 1, the membrane valve assembly 10 presented herein is well suited for the provision of biased spring packets that can easily be released after screwing the housing top portion 24 onto the intermediate member 18; in other words, the spring force comes into effect only when the bottom housing portion 12 designed as a flow body member is mounted.

The top housing portion 24 is provided with upper and lower air connecting pieces 56, 58 communicating via bores 57 and 59, respectively, with an upper cylinder chamber 52 and a lower cylinder chamber 54, respectively, whereby the upper and lower cylinder chambers 52 and 54, respectively, are separated from each other by the piston member 32. Depending on the mode of operation of the membrane valve assembly 10 that is chosen, the air connecting pieces 56 and 58 are supplied with pressurized air for controlling the valve assembly.

Figure 2:
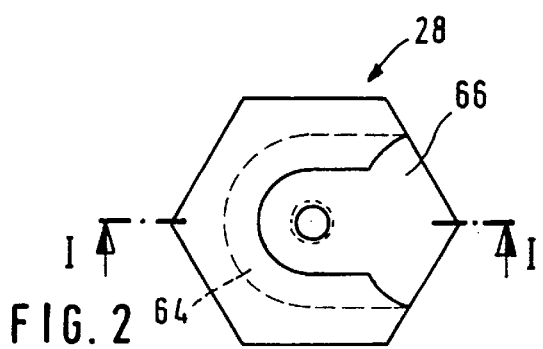
FIG. 2 shows a top view of a membrane support member.
Figure 3:
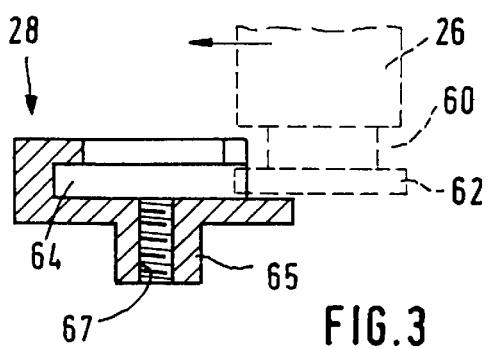
FIG. 3 shows a sectional view of the membrane support member of FIG. 2, taken along the line I—I in FIG. 2.

As can be seen form FIGS. 2 and 3, the membrane support member 28, designed as a coupling piece and positively inserted into the pressure piece 30 (FIG. 1), has an essentially hexagonal shape. Integrally formed with the membrane support member 28 is a pin 65 that has an inner thread 67 for the screw connection 23 of the membrane member 22 (FIG. 1). In a direction running perpendicular to the extension of the axis of the interior thread 67, that coincides with the z-axis of the pressure spindle member 26 when the membrane valve assembly is assembled, a groove 64 is machined into the membrane support member 28. That annular groove 64 in the membrane support member 28 is designed as a first coupling element cooperating with and adapted to be engaged by a second coupling member. That second coupling member is constituted by an annular ridge 62 formed by virtue of the provision of a circumferential groove 60 machined into the pressure spindle member 26 at its front face end. Thus, a releasable groove/ridge-connection can be established.

For coupling the pressure spindle member 26 with the membrane support member 28, a recess 66 in the membrane support member 28 is provided and designed such that the free end of the pressure spindle member 26 can be laterally inserted into the groove 64. The recess 66 is enlarged in such a way that a coupling of the pressure spindle member 26 to the membrane support member 28 is possible in any arbitrary z-position of the pressure spindle member 26. The following insertion of the pressure piece 30 locks the coupling and prevents the membrane support member 28 from being displaced radially.

The membrane support member is preferably made of a high grade steel. Depending on the requirements as far as resistance against chemical ingredients, regulations etc. are concerned, it may be possible to manufacture that element of brass or stainless steel. As the pressure spindle member 26 must be provided only with the circumferential groove 64 for being coupled to the membrane support member 28, also the pressure spindle member 26 can be inexpensively manufactured on an automatic turning lathe.

Since the dimensions of the membrane support member 28 can be relatively large, the pressure piece 30 may be manufactured of plastic material because of the low specific pressure resulting from the large dimensions of the membrane support member 28. The pressure piece 30 does not require a metallic insert, and the pressure spindle member 26 can be designed smaller by virtue of the metal/metal connection with the membrane support member 28.

The embodiment of the membrane support member 28 illustrated in FIGS. 1–3 is provided for receiving membrane members 22 having a threaded connecting portion 23. It is understood that the pin 65 provided on the membrane support member 28 can be also designed for being connected to a membrane member having a bayonet connecting portion. Thus, by providing only two embodiments of membrane support members 28, i.e. one with a thread and one with a bayonet, it is possible to make use of many kinds of membrane members even at a later stage. A new mode of coupling, e.g. by means of a metric thread, is possible at any time because only the membrane support member 28 has to be redesigned, while the drive mechanism for the valve assembly is not required to be changed. Thus, the drive mechanism for the valve assembly can be prefabricated as a complete unit in series, independently of the embodiment of the membrane support member; the result is that an optimized and inexpensive modular construction can be realized.

Referring again to FIG. 1, the top housing portion 24 is screwingly connected to the intermediate piece 18 by means of corresponding threads 68, 70 whereby a sealing ring 72 is inserted there between. In order to ensure that the air connection pieces 56, 58 provided on the top housing portion 24 are exactly positioned after the top housing portion 24 having been screwed onto the intermediate piece 18, and in order to ensure that the connection between the top housing portion 24 and intermediate piece 18 is locked, the top housing portion 24 and the intermediate piece 18 are provided with stop faces 74 and 76, respectively, that engage each other after the screwed connection having been established.

Figure 4:
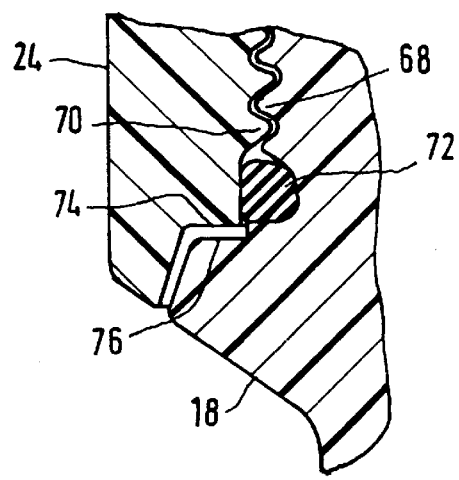
FIG. 4 shows the portion of FIG. 1 marked by the letter A in an enlarged scale.
Figure 5:
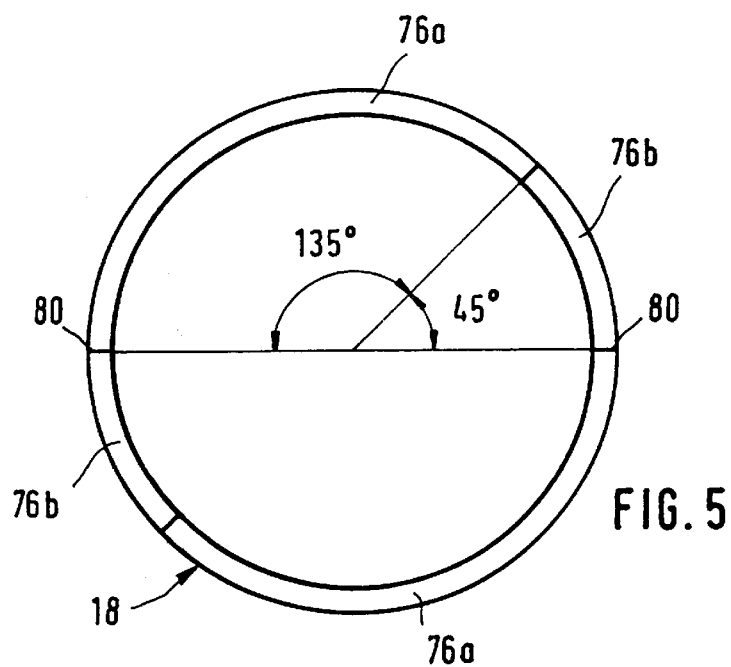
FIG. 5 shows a top view oft the stop surface of the intermediate member that is illustrated in FIG. 1.
Figure 6:
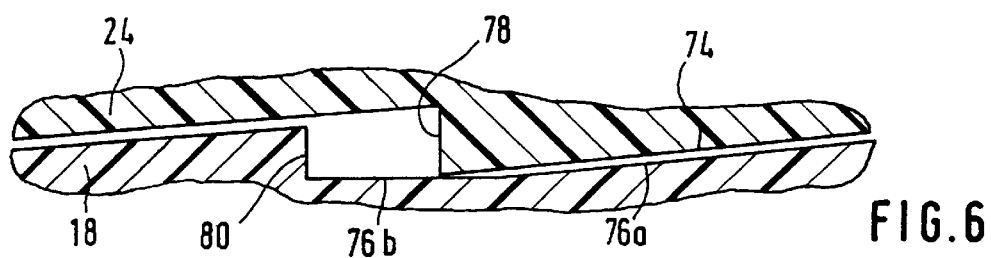
FIG. 6 shows a lateral view of the stop surfaces of the top portion of the housing and of the intermediate member that is illustrated in FIG. 1, whereby the mutual bias of the threads just begins.

According to FIG. 4–6, each of the stop faces 74 and 76, respectively, that run around 360° comprises two partial stop face portions each running around 180°. Both partial stop face portions are provided with a pitch that at least partially differs from zero. Thus, the pairs of partial stop face portions are delimited from each other by step-shaped end stop members 78 and 80. The stop faces 74 provided on the top housing potion 24 are provided along their entire extension with a pitch that corresponds to the pitch of the threads 68 and 70, respectively, of the intermediate piece 18 and the top housing portion 24, respectively. The two end stop faces 76 on the intermediate piece 18 are provided with the above mentioned pitch along a portion 76a extending around 135°. In a further portion 76b subsequent to that portion 76a and extending around 45°; the pitch of the stop surface has the value zero.

The effect of these partial portions 76b with a pitch of zero results clearly from a consideration of FIG. 6. In the end phase of establishing the connection between top housing portion 24 and intermediate piece 18 by screwing, a portion of the stop face 74 of the top housing portion 24 slides on the portion 76a of the intermediate piece 18. By the decrease of the pitch of the portion 76b with regard to the pitch of the portion 76a, a continuously increased biasing in the thread connection 68, 70 is established during rotation of the top housing portion 24 relative to the intermediate piece 18. As soon as the two step-shaped end stop members 78, 80 meet each other, the biasing has reached a predetermined value with the result that the two elements 24, 18 screwed onto each other are secured against an unintentional loosening.

The membrane valve assembly 10 is designed such that the housing portions 12, 24, the intermediate piece 18, the piston member 32 as well as the pressure piece 30 can be manufactured of plastic material.

What is claimed is:

1. A membrane valve assembly, comprising:
   a housing means including a top housing portion, an intermediate piece means and a bottom housing portion;
   a membrane means;
   a pressure piece means adapted to cooperate with said membrane means;
   a pressure spindle means for operating said pressure piece means and, thereby, said membrane means;
   a membrane support means;
   a drive means for driving said pressure spindle means;
   said membrane support means being designed as a coupling means and engaging said pressure piece means;
   said membrane means being connected to said membrane support means by means of a releasable coupling means extending through said pressure piece means;
   whereby said pressure spindle means can be coupled with said membrane support means with the help of a releasable groove/ridge connection such that said membrane support means can be removed and exchanged, respectively, independently of the position of the pressure spindle means, said drive means being in its assembled position.

2. A membrane valve assembly according to claim 1 in which said groove/ridge connection is constituted by a ridge means in the shape of an annular projection located at the front face of said pressure spindle means, and by an annular groove means provided in said membrane support means and at least partially receiving said ridge means.

3. A membrane valve assembly according to claim 2 in which said annular ridge is constituted by providing an annular groove close to the front face end of said pressure spindle means.

4. A membrane valve assembly according to 1 in which said membrane support means comprises a recess that is designed such that the groove/ridge connection required for connecting said pressure spindle means to said membrane support means can be established even if said membrane support means is inserted into said intermediate piece means.

5. A membrane valve assembly according to claim 1 in which only said membrane support means has to be replaced if the membrane means of the EPDM type is exchanged by a membrane means of the PTFE type.

6. A membrane valve assembly according to claim 1 in which said pressure spindle means is designed as a simple turned component.

7. A membrane valve assembly according to claim 1 in which said membrane support means is designed as a component of hexagonal shape and ensures, in combination with said pressure piece, the connection between said membrane support means and said membrane means.

8. A membrane valve assembly according to claim 1 in which the dimensions of said membrane support means are chosen such that, due to the low specific pressure, a pressure piece means made of plastic material can be used.

9. A membrane valve assembly according to claim 1 in which said top housing portion is connected to said intermediate piece means by means of thread means, said top housing portion and said intermediate piece means comprising circumferential stop face means resting on each other and having at least partially differing pitch values for establishing a bias in said thread means when said top housing portion and said intermediate piece means are screwed onto each other, whereby the rotating screwing movement is limited by an end stop means constituted by said circumferential stop face means.

10. A membrane valve assembly according to claim 9 in which each of said circumferential stop face means is provided in pairs offset to each other by 180° to thereby constitute said end stop means.

11. A membrane valve assembly according to claim 9 in which one of said circumferential stop face means, preferably the stop face means provided on said intermediate piece means, comprises two portions having differing pitch values, whereby the second portion has a lower pitch value than the first portion, preferably a pitch with the value zero, for providing a predetermined bias in the screw connection.

12. A membrane valve assembly according to claim 11 in which said first portion of said circumferential stop face means extends around approximately 135° and said second portion of said circumferential stop face means extends around approximately 45°.

* * * * *